United States Patent
Tremaine

[19]

[11] Patent Number: 5,819,231
[45] Date of Patent: Oct. 6, 1998

[54] COMPENSATION PLANNING TOOL AND METHOD

[75] Inventor: John L. Tremaine, Sterling Heights, Mich.

[73] Assignee: Electronic Data Systems Corporation, Plano, Tex.

[21] Appl. No.: 617,672

[22] Filed: May 1, 1996

[51] Int. Cl.[6] .............................................. G06F 157/00
[52] U.S. Cl. .................................................. 705/7; 705/1
[58] Field of Search ............................. 705/7, 1, 10, 11, 705/30, 32; 434/107, 108, 109

[56] References Cited

U.S. PATENT DOCUMENTS

| | | | |
|---|---|---|---|
| 4,750,121 | 6/1988 | Halley et al. | 364/408 |
| 4,819,162 | 4/1989 | Webb, Jr. et al. | 364/401 |
| 4,908,758 | 3/1990 | Sanders | 364/300 |
| 4,969,094 | 11/1990 | Halley et al. | 364/408 |
| 4,989,141 | 1/1991 | Lyons et al. | 364/408 |
| 5,187,787 | 2/1993 | Skeen et al. | 395/600 |
| 5,189,608 | 2/1993 | Lyons et al. | 364/408 |
| 5,257,369 | 10/1993 | Skeen et al. | 395/650 |
| 5,276,607 | 1/1994 | Harris et al. | 364/401 |
| 5,293,615 | 3/1994 | Amada | 395/600 |
| 5,339,392 | 8/1994 | Risberg et al. | 395/161 |
| 5,339,410 | 8/1994 | Kanai | 395/600 |
| 5,361,393 | 11/1994 | Rossillo | 395/650 |
| 5,459,657 | 10/1995 | Wynn et al. | 364/401 |
| 5,600,554 | 2/1997 | Williams | 395/201 |

*Primary Examiner*—Kevin J. Teska
*Assistant Examiner*—Raymond H. Dalziel
*Attorney, Agent, or Firm*—Terry J. Stalford; L. Joy Griebenow

[57] ABSTRACT

Compensation planning tool (24) for use in connection with a computing device (12). A compensation planner (25) may receive and store compensation information for a plurality of employees. The compensation information preferably includes an identifier (100), a current salary (112), a current bonus (130), a current salary guideline (78), a current total compensation guideline (80), a planned salary action (122), a planned bonus action (132) and a ranking (108). The compensation planner (25) may sort the employees by rank and display a compensation plan. The compensation plan may include a current total compensation (103), a planned salary (108) and a planned total compensation (105) for each employee. A report (210) may be generated from the compensation plan. The report (210) may include a representation (214) of the planned total compensation for each employee arranged by rank. The representations may be operable to visually display the correlation between the rank and the total compensation of the employees in the compensation plan.

20 Claims, 7 Drawing Sheets

| Job Codes | Job Titles (2 lines) | Min Salary / Max Salary / Max Tot Cmp | Regional Factor 1.00 |
|---|---|---|---|
| 12345 | Chief Cook | $30,000 $40,000 $50,000 | |
| 54321 | Bottle Washer | $10,000 $20,000 $25,000 | |

75 — Job Codes; 76 — Job Titles; 80 — Min Salary; 78 — Max Salary / Max Tot Cmp; 82 — Regional Factor

*FIG. 3B*

| Name & Soc Nos | Total Comp Value | | Slry % of Tot |
|---|---|---|---|
| | 1995 | 1996 | |
| | % to Mid | % to Mid | 1995 |
| | % to Max | % to Max | 1996 |
| Williams 222-22-2222 | $34,000 85.0 68.0 | $36,000 90.0 72.0 | 88.0 88.0 |
| Smith 111-11-1111 | $32,000 80.0 64.0 | $34,000 85.0 68.0 | 93.8 94.0 |

| Name and Soc Sec Nos | Start Dt, Rank and End Date | Job Code and Title | Reference Points for this Job Cd | |
|---|---|---|---|---|
| | | | Mid: Salary Comp Max: Salary Comp | Mid: Total Comp Max: Total Comp |
| Williams 222-22-2222 | 1/1/95 1 | 12345 Chief Cook | $35,000 $40,000 | $40,000 $50,000 |
| Smith 111-11-1111 | 1/1/95 2 | 12345 Chief Cook | $35,000 $40,000 | $40,000 $50,000 |

| Name and Soc Sec Nos | Last Salary Action | | Current Salary | Next Increase Recommendation | | Salary After |
|---|---|---|---|---|---|---|
| | Months Since Then | | | | | |
| | Percent Months | Amount Date | % to Mid<br>% to Max | Percent Months | Amount Date | % to Mid<br>% to Max |
| Williams<br>222-22-2222 | 6.70<br>12.0 | $2,000<br>1/1/96 | $32,000<br>91.4<br>80.0 | 6.25<br>12.0 | $2,000<br>1/1/97 | $34,000<br>97.1<br>85.0 |
| Smith<br>111-11-1111 | 6.70<br>12.0 | $2,000<br>1/1/96 | $32,000<br>91.4<br>80.0 | 3.12<br>12.0 | $1,000<br>1/1/97 | $33,000<br>94.2<br>82.5 |

FIG. 3F

| Name and Soc Sec Nos | DATES | COMMENTS |
|---|---|---|
| | Perf Aprsl | |
| | Promotn | |
| Williams<br>222-22-2222 | 12/1/96 | Nancy is on a fast growth curve, a real performer!<br>Expect to continue increases. |
| Smith<br>111-11-1111 | 12/1/96 | Dave's growth is the typical. |

FIG. 3G

| Name and Soc Sec Nos | 3 Mth Actvy Sched | | |
|---|---|---|---|
| | A | M | J |
| Williams 222-22-2222 | B | | |
| Smith 111-11-1111 | B | | |

| Name and Soc Sec Nos | Performance Bonuses 1st Row = asterisk to exclude from your P&L 2nd Row = Amount, 3rd Row = Date | | | |
|---|---|---|---|---|
| | First | Second | Third | Fourth |
| Williams 222-22-2222 | $2,000 4/1/96 | * $2,000 10/1/96 | $2,000 4/1/97 | $2,000 10/1/97 |
| Smith 111-11-1111 | $1,000 4/1/96 | $2,000 10/1/96 | $1,000 4/1/97 | $1,000 10/1/97 |

Total Compensation = $70,000   Row 1 = Salary Amts. Row 2 = Bonus Amts.
Salary as % of Total Compstn = 91.4   Row 3 = Bonuses that will not be hitting your P&L

| Name and Soc Sec Nos | 1 Jan | 2 Feb | 3 Mar | 4 Apr | 5 May | 6 Jun | 7 Jly | 8 Aug | 9 Sep | 10 Oct | 11 Nov | 12 Dec |
|---|---|---|---|---|---|---|---|---|---|---|---|---|
| Williams 222-22-2222 | 2,667 0 0 | 2,667 0 0 | 2,667 0 0 | 2,667 2,000 0 | 2,667 0 0 | 2,667 0 0 | 2,667 0 0 | 2,667 0 0 | 2,667 0 0 | 2,667 2,000 0 | 2,667 0 0 | 2,667 0 0 |
| Smith 111-11-1111 | 2,667 0 0 | 2,667 0 0 | 2,667 0 0 | 2,667 1,000 0 | 2,667 0 0 | 2,667 0 0 | 2,667 0 0 | 2,667 0 0 | 2,667 0 0 | 2,667 1,000 0 | 2,667 0 0 | 2,667 0 0 |

| Employee Name and Ranking | Compensation Activities for 1996 & 1997 Salary (Light) = Perc of Incr, as a whole # Bonus (Dark) = Amount in Thousands | | | | | | | | | | | | Total Compensation (Salary + Bonus in $K) For 1995 & 1996 | | | | | | | | | 2 Yr Slry Grwth | | | Total Compensation | | | | | Slry % of Tot | | Current Salary | | | Next Increase Recommendation | | | | Salary After | | | Next Performance Bonus |
|---|---|---|---|---|---|---|---|---|---|---|---|---|---|---|---|---|---|---|---|---|---|---|---|---|---|---|---|---|---|---|---|---|---|---|---|---|---|---|---|
| | J | F | M | A | M | J | J | A | S | O | N | D | 26 | 30 | 34 | 38 | 42 | 46 | 50 | | | | 21 to 30 Perc | 11 to 20 Perc | 1 to 10 perc | 1995 | 1996 | % to Mid | % to Max | % to Mid | % to Max | 1995 | 1996 | | % to Mid | % to Max | Percent | Months | Amount | Date | | % to Mid | % to Max | |
| Williams 1 | | | | | | | | | | | | | | | | | | | | Nancy is on a fast growth curve, a real performer! Expect to continue increases. | | | | | | $34,000 85.0% 68.0% | $36,000 90.0% 72.0% | | | 88.0% 88.0% | $32,000 91.4% 80.0% | | 6.25% 12.0 | | $2,000 1/1/97 | | $34,000 97.1% 85.0% | | 4/1/96 $2,000 |
| Smith 2 | | | | | | | | | | | | | | | | | | | | Dave's growth is typical. | | | | | | $32,000 80.0% 64.0% | $34,000 85.0% 68.0% | | | 93.8% 94.0% | $32,000 91.4% 80.0% | | 3.12% 12.0 | | $1,000 1/1/97 | | $33,000 94.2% 82.5% | | 4/1/96 $1,000 |

FIG. 4

COMPENSATION PLANNING TOOL AND METHOD

TECHNICAL FIELD OF THE INVENTION

The present invention relates generally to financial applications for computer systems, and more particularly to a compensation planning tool and method.

BACKGROUND OF THE INVENTION

Contemporary business operations are financially sophisticated. Consequently, business managers are often required to prepare and submit detailed financial plans covering many aspects of their operations, including employee compensation. Employee compensation plans are subject to close scrutiny, and thus must be fair to employees. Additionally, employee compensation plans must be realistic and accurate because managers are often required to adhere to such plans.

Recent trends in the compensation of employees, however, have made compensation planning for employees more challenging. Major factors contributing to current compensation trends include a change in performance assessment and an emphasis on total compensation. Performance assessment techniques often place an increased importance upon an individual's value to the organization and his or her relationship to the mid-point value of their salary range. As a result, the compensation planning process is more computation-intensive. This complexity is further increased when a compensation plan is made to encompass an extended time frame.

Total compensation plans allow employees to re-earn a portion of their compensation each year. Typically, in a total compensation plan, a portion of an employee's compensation is based on past performance and is thus salaried while the remaining portion is based on current performance and is earned as a bonus. The emphasis on total compensation adds a new range of evaluations and decisions in planning the components of an employee's compensation. Thus, it adds still another level of complexity to the compensation planning process.

SUMMARY OF THE INVENTION

In accordance with the present invention, a compensation planning tool and method is provided that substantially eliminates or reduces the disadvantages and problems associated with the prior art.

In accordance with the present invention, the compensation planning tool is used in connection with a computing device. The compensation planning tool includes a compensation planner operable to receive and store compensation information for a plurality of employees. The compensation information preferably includes an identifier, a current salary, a current bonus, a current salary guideline, a current total compensation guideline, a planned salary action, a planned bonus action and a ranking. The compensation planner may be operable to sort the employees by rank and to display a compensation plan. The compensation plan may include a current total compensation, a planned salary and a planned total compensation for each employee. The compensation planner may generate a report including a representation of the planned total compensation for each employee arranged by rank. The representations may visually display the correlation between the rank and the total compensation of the employees in the compensation plan.

More specifically, in accordance with one embodiment, the salary guideline may comprise a salary minimum and a salary maximum. The total compensation guideline may comprise a total compensation maximum. In this embodiment, the compensation planner may display a percent to mid-point value and a percent to maximum value for the current salary. A percent to mid-point value and a percent to maximum value may also be displayed for the current total compensation.

Additionally, the compensation planner may generate from the compensation plan a schedule of activities for each employee. An outlook record may also be generated from the compensation plan. The outlook record may include the total compensation arranged by month of the employees.

Important technical advantages of the present invention include an improved compensation planning tool and method. In particular, the invention simplifies the entry of compensation plans and facilitates the analysis and reporting of those plans. Data entry is simplified through the use of extensive automatic calculation features. To facilitate analysis, the compensation planning tool includes representations that visually display the correlation between the rank and the total compensation of the employees in the compensation plan. This correlation provides a means for determining whether the compensation plan is fair to the employees.

Another important technical advantage of the present invention includes providing a compensation planning tool that generates realistic profit and loss (P&L) outlooks. Accordingly, information generated from the compensation planning tool may be also used for accounting, budgeting or other financial planning purposes.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulation(s) of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer.

In addition, it should be understood that the programs, processes, methods, etc. described herein are not related or limited to any particular computer or apparatus. Rather, various types of general purpose computing machines or devices may be used with programs constructed in accordance with the teachings described herein. Similarly, it may prove advantageous to construct specialized apparatus to perform the method steps described herein by way of dedicated computer systems with hardwired logic or programs stored in non-volatile memory, such as read only memory.

Figure 1:
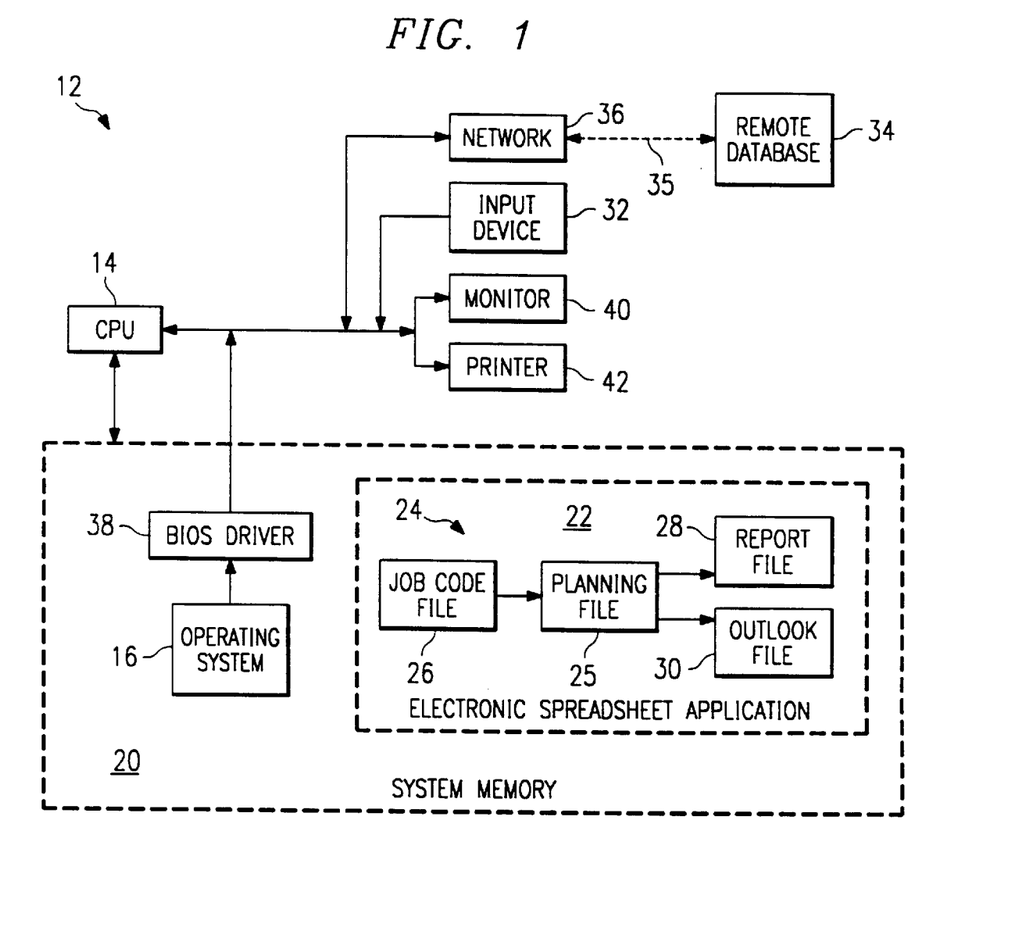
FIG. 1 is a schematic block diagram of a computer system for compensation planning in accordance with the present invention.

Referring now in more detail to the drawings, in which like numerals refer to like parts throughout the several views, FIG. 1 is a schematic block diagram of the components of a preferred operating environment, a computer system 12. The computer system 12 comprises a central processing unit (CPU) 14 that operates the computer system in conjunction with an operating system 16 to retrieve, process, store, and display data.

The CPU 14 is typically implemented as a microprocessor, such as that manufactured by Apple Computer or by Intel Corporation. The CPU 14 communicates control, address, and data signals with the operating system 16 and with the remaining components of the computer system 12 through a system bus.

The operating system 16 comprises a set of computer programs that control the internal functions of the computer system 12, thereby allowing the computer system to run application software. The operating system 16 is typically installed in the mass storage device, such as a hard disk drive, a floppy disk drive, a CD disk drive, or a ROM chip. During boot-up (initialization) of the computer system 12, the operating system 16 is loaded into system memory 20.

A computer-implemented application program 22 is also loaded into the system memory 20 from a hard disk drive, a floppy disk drive, or a CD disk drive. The application 22 may be an electronic spreadsheet or other program capable of manipulating data. Preferably the application 22 allows macros to be programmed for manipulating data, such as automatic calculations, and for creating or populating documents, such as a report or the like.

In a particular embodiment, the application program 22 may include one or more associated files that together form the compensation planning tool 24. The associated files 24 may be opened and closed by the application program 22. In this embodiment, the compensation planning tool 24 may include a compensation planner 25 and a job code file 26 to supply the planner 25 with salary and total compensation guidelines. The compensation planner 25 may include a report generator to generate a report file 28 and an outlook generator to generate an outlook record 30. The report file 28 is an output of the compensation planner 25. The report file 28 is a template used by the compensation planner's 25 reporting functionality. The outlook record 30 is also an output of the compensation planner 25. The outlook record 30 preferably is a template for a typical two year profit and loss (P&L) schedule, although a different length of time may be more appropriate for different users. As will be discussed later in more detail, salary and bonus line items are present in the outlook file 30. The outlook file 30 is automatically updated with the compensation planner 25.

A remote data base 34 containing job code information for all positions of a business may be used to populate the job code file 26. In this embodiment, the remote data base 34 may be linked with the compensation planner 25 via a network 35 and a network interface 36. The network 35 may be a local area network (LAN) or may be a larger national or international network.

The application program 22 operates in conjunction with the operating system 16 to request and receive information from a user. Such information may be received through an input device 32. The input device 32 may be a keyboard, a mouse, a track pad, or the like.

A basic input/output system (BIOS) driver 38 is stored in system memory 20 along with the operating system 16 and the application program 22. The BIOS driver 38 supplies the device-level control and support services for primary input/output devices of the computer 12 during the boot process. After a boot, the BIOS driver 38 accepts requests from the application program 22 and from the operating system 16 running on the computer system 12 and performs input/output services as requested by those programs. The functions and operations of conventional BIOS drivers are well known and will not be further described.

The application program 22 is called by the operating system 16 upon request by a user. Data is passed from the application program 22 to the CPU 14 and BIOS driver 38 by operating system 16. Data may be displayed electronically by a monitor 40 or a hard copy may be generated by a printer 42 as a result of data sent from the operating system 16 to the BIOS driver 38.

According to a specific embodiment of the present invention, the computer system 12 may be an "INTEL" platform manufactured by Compaq Computer. In this embodiment, the application 22 may be implemented as an electronic spreadsheet, such as "MICROSOFT EXCEL version 5.0" manufactured by Microsoft Incorporated.

Figure 2:
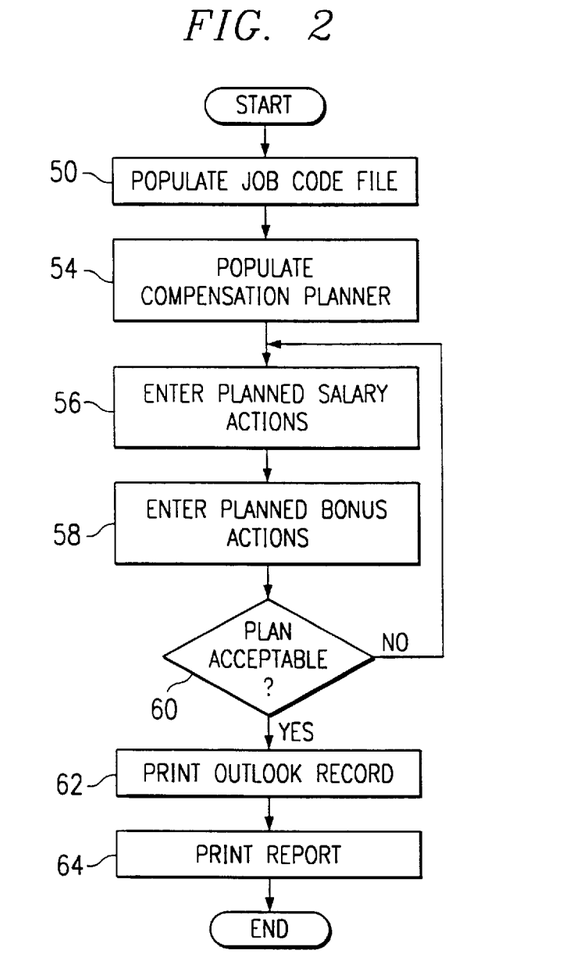
FIG. 2 is a flow chart from a user's perspective of the compensation planning process in accordance with the present invention.

FIG. 2 shows a process by which a user may prepare a compensation plan using the compensation planning tool 24 of the present invention. Screen displays of the user process are shown by FIGS. 3A–I for the "MICROSOFT EXCEL" application program 22.

The user process begins at step 50 in which the user populates the job code file 26. As previously discussed, the remote database 34 may be used to populate the job code file 26. If access to the remote database 34 does not exist, the job code file 26 may be manually populated by the user by directly entering data into the file.

Figure 3A:
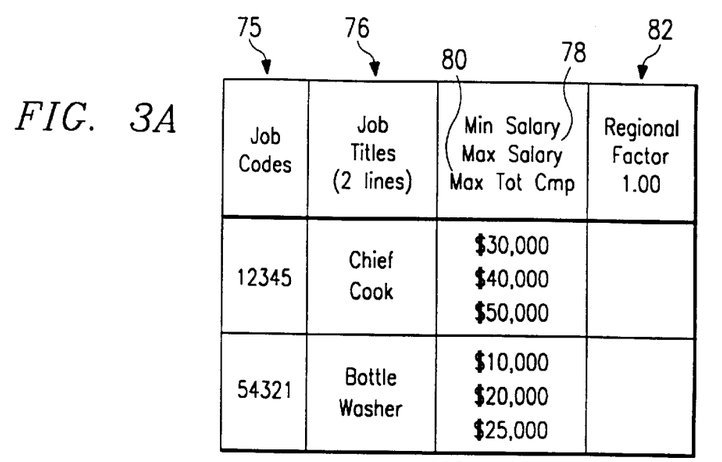
FIGS. 3A–I illustrate exemplary computer displays for compensation planning in accordance with the present invention.

FIG. 3A illustrates one embodiment of the job code file 26. In this embodiment, the job code file 26 may include a listing of one or more job codes 75 and their corresponding titles 76. For example, the job code file 26 of FIG. 3A includes a listing of the job code "12345" for "Chief Cook" and the job code "56789" for "Bottle Washer."

For each job code 75, the job code file 26 may also include a salary guideline 78 and a total compensation guideline 80. The salary guideline 78 may include a minimum salary and a maximum salary. The Chief Cook job code has a minimum salary of $30,000 and a maximum salary of $40,000. The salary guideline 78 may also include a salary mid-point. The salary mid-point may be the numeric mid-point between the minimum and the maximum salary or may represent an average salary for the job code. The total compensation guideline 80 may include a maximum total compensation. The Chief Cook job code has a total compensation of $50,000. The total compensation guideline 80 may also include a total compensation minimum, if different form the salary minimum, and a total compensation mid-point. The total compensation mid-point may be the numeric mid-point between the minimum and the maximum total compensation or may represent an average total compensation for the job code.

The job code file 26 may also include a regional factor 82. The regional factor compensates for the costs of living differences in various geographical areas. The salary and total compensation guidelines are multiplied by the regional factor 82 when the guidelines are loaded into the planning file 25.

Figure 3B:
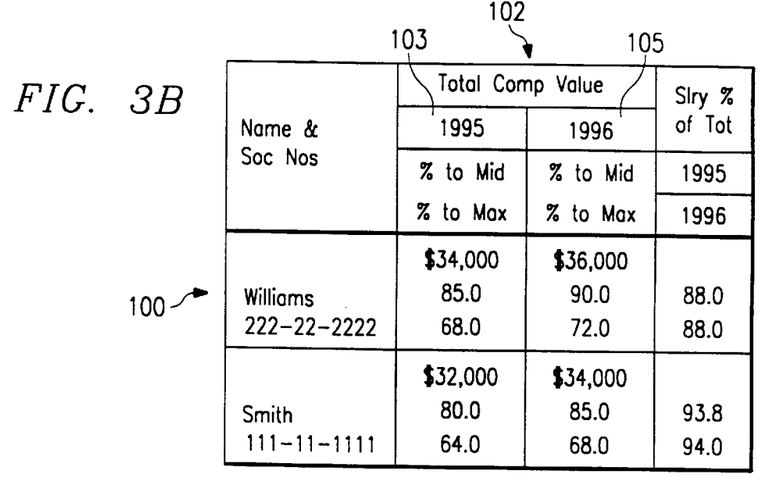

Proceeding to step 54 of the user process, the user may populate the compensation planner 25 with compensation information for a plurality of employees. One embodiment of the compensation planner 25 is illustrated by FIGS. 3B–F. The compensation information received by the planner 25 may include an identifier 100 for each employee. As shown by FIG. 3B, the identifier 100 may include a name and a social security number. Here, the compensation planner 25 includes two employees identified as "Williams" and "Smith." Williams has a social security number of "222-22-2222." Smith has a social security number of "111-11-1111."

After the user has entered the identifiers 100, the job codes 75 and associated information may be automatically loaded into the compensation planner 25. Additionally, the user may at any time update the job codes 75 and associated information in the compensation planner 25. In response, the compensation planner 25 may retrieve and store the job codes 75, salary guidelines 78 and total compensation guidelines 80 of the job code file 26.

The compensation planner 25 may display overview information 102 for each employee next to their identifier 100. The overview information 102 may include each employee's total compensation for the years included within the compensation plan and the percent of each year's total compensation that is based on salary. Thus, the overview information may include a current total compensation 103 and a planned total compensation 105. The overview information 102 may be calculated by the compensation planner 25 based on the compensation information received for each employee.

Figure 3C:
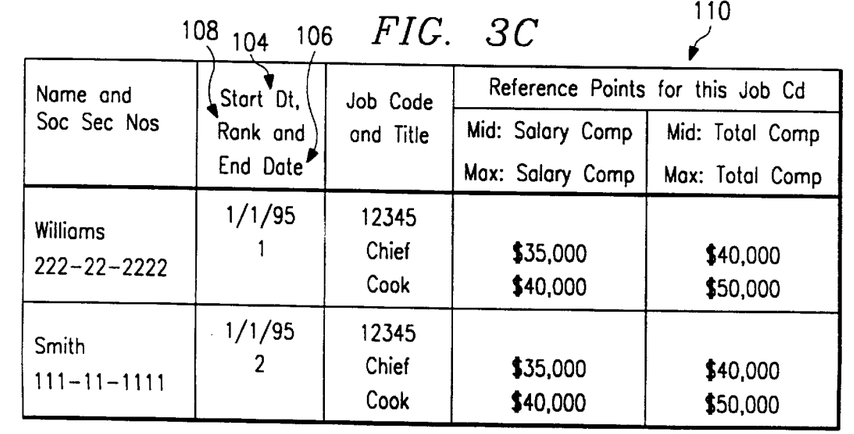

As shown by FIG. 3C, the compensation information may also include a start date 104, an end date 106 and a ranking 108 for each employee. The start date 104 is the date that an employee began working in the group for which the compensation plan is being made. Here, both Williams and Smith began working on Jan. 1, 1995.

The compensation planner 25 uses the start date 104 to determine the date that each employee's salary began effecting the profit and loss balance sheets of the group. In one embodiment, the absence of a start date 104 may be interpreted by the compensation planner as meaning that the employee is an old employee who started prior to the beginning of the time frame of the compensation plan. In this embodiment, only new employees who started during the period of the compensation plan need to have a start date 104 entered.

The end date 106 is used by the compensation planner 25 to determine the date that an employee's salary will stop effecting the profit and loss balance sheets of the group. Thus, an employee's end date 106 will cause that employee's salary to stop effecting the profit and loss balance sheets thereafter. In one embodiment, the absence of an end date 106 may be interpreted as meaning that the employee will remain in the group throughout the time frame of the compensation plan. In this embodiment, only employees who left the group during the period of the compensation plan need to have an end date 106 entered.

An important feature of the present invention is the rankings 108 of the employees. Generally, each employee's ranking 108 represents the value of that employee to the business. The rankings 108 allow the employees to be sorted and their compensation correlated to their rank. This correlation provides an indication of the value, or worth, of the compensation plan. The employees may each be assigned an individual rank or be grouped into a smaller number of ranking ranges. For example, twenty employees may be ranked between 1 and 5. Here, Williams is ranked as a "1" while Smith is ranked as a "2."

The compensation information for each employee may also include a job code 75. The job code should match one of the codes entered into the job code file 26 and subsequently loaded into the compensation planner 25. For each of the job codes, the compensation planner 25 may display the proper job title 76 and reference points 110. The reference points 110 may be determined from the salary and total compensation guidelines stored with the job code 75 in the compensation planner 25. The reference points 110 may include a salary mid-point, salary maximum, total compensation mid-point and total compensation maximum. Here, Williams and Smith each have a job code of "12345." Thus, both Williams and Smith are a Chief Cook and have a salary mid-point of $35,000 and a maximum salary of $40,000. The total compensation mid-point is $40,000 and the maximum total compensation is $50,000.

Figure 3D:
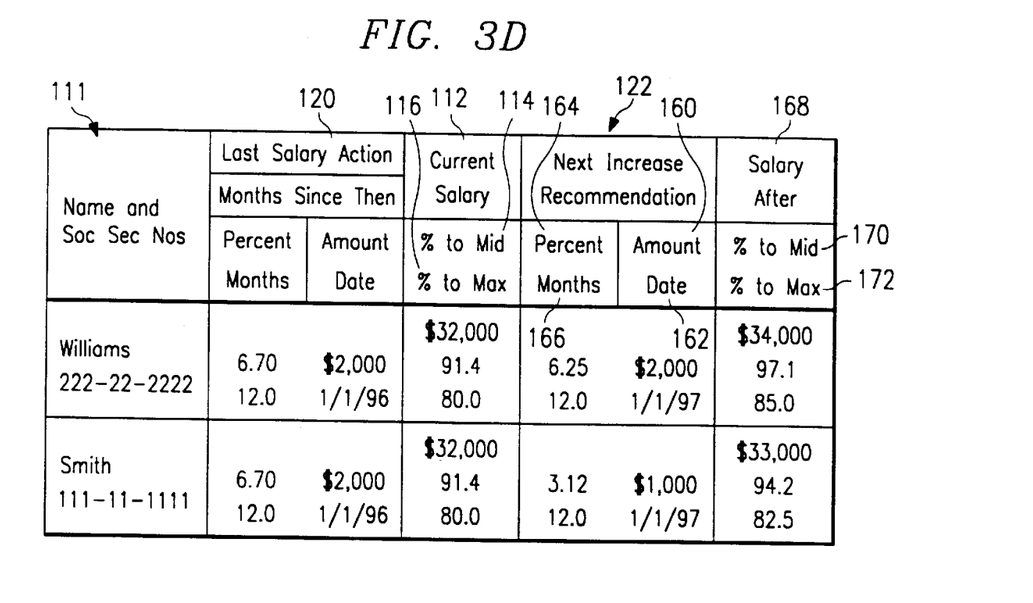

FIG. 3D illustrates a salary display 111 shown by the salary screen display 111. The compensation information may include a current salary 112. Here both Williams and Smith have a current salary of $32,000. Based on the current salary 112, the compensation planner may determine a salary percent to mid-point value 114 and a salary percent to maximum value 116. The $32,000 salaries of Williams and Smith are 91.4 percent of the salary midpoint and 80 percent of the salary maximum. The salary percent to mid-point 114 and the salary percent to maximum 116 are determined by the compensation planner 25 from the reference points 110. As will be discussed below in detail, the salary display 111 may also include a historical salary action 120 and one or more planned salary actions 122.

Figure 3E:
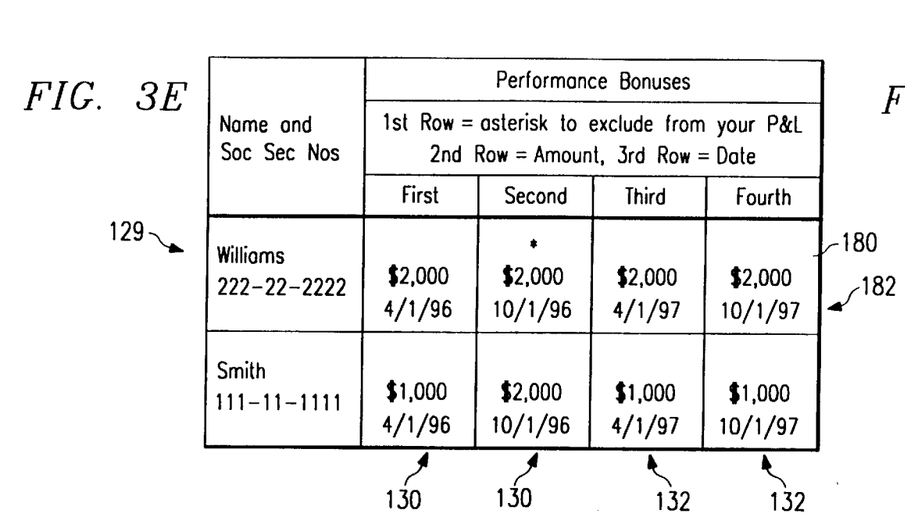

The compensation information may include a current bonus 130. FIG. 3E illustrates bonus display 131 including the current bonuses 130 for Williams and Smith. Here, Williams is to receive a $2,000 bonus on Apr. 1, 1996 and another $2,000 bonus on Oct. 1, 1996. Smith is to receive a $1,000 bonus on Apr. 1, 1996 and a $1,000 bonus on Oct. 1, 1996. The bonus display 130 may also include a number of planned bonus actions 132.

Figure 3F:
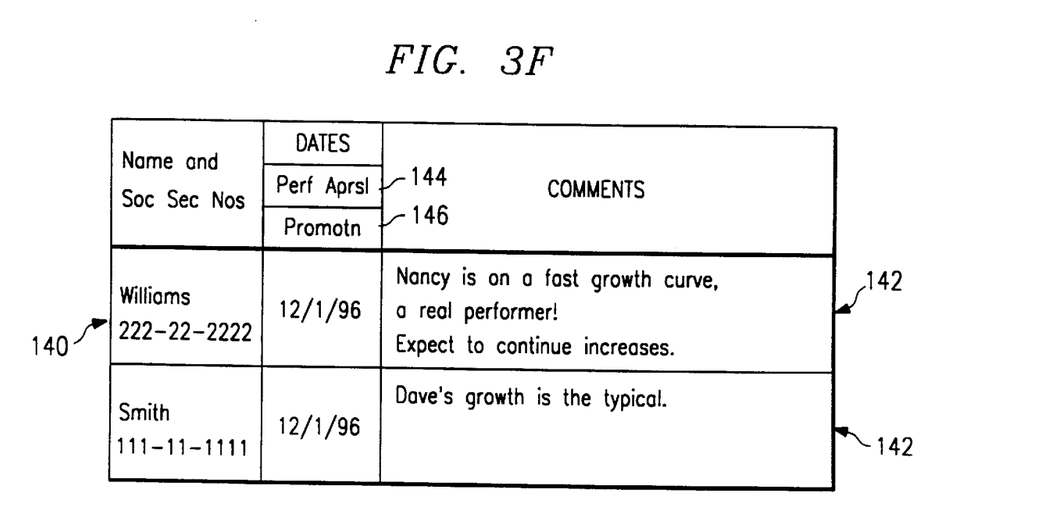

FIG. 3F illustrates an appraisal screen 140. The compensation information may include an appraisal 142 of each employee. The appraisal 142 allows a manager to enter comments concerning each employee's performance for further reference. Here, Williams has an appraisal 142 that she is on a fast growth curve and is a real performer. Smith has an appraisal 142 that his growth is typical.

A next appraisal date 144 and a next promotion date 146 may also be entered into the appraisal display 140. Here, both Williams and Smith have a next performance appraisal scheduled for Dec. 1, 1996. Neither is currently scheduled for a promotion. The appraisal display 140 may further include a next recognition date.

Figure 3G:
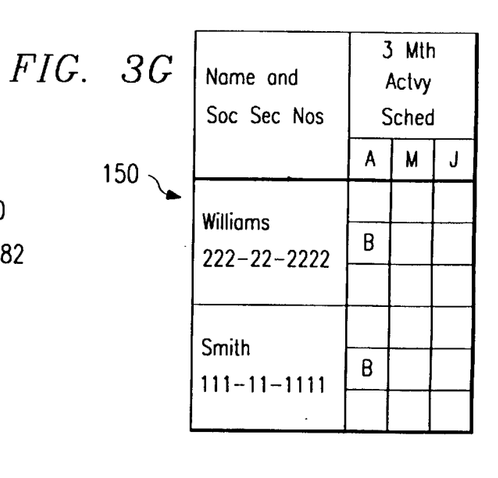

FIG. 3G illustrates an activity schedule 150. The activity schedule 150 may be generated by the compensation planner 25 based on the compensation information entered by the user. As shown by FIG. 3G, the activity schedule 150 may display activities scheduled during the next several months. In FIG. 3G, the activity schedule 150 displays the months of April, May and June, which are respectively represented by an "A," "M" and a "J." Both Williams and Smith have a bonus action 132 scheduled in April. The bonus action is represented by a "B." Although not shown by activity schedule 150, a salary action may be represented by a "S," an appraisal by an "A,", a promotion by a "P," and a recognition by an "R." The activity schedule 150 provides a manager with an overview of upcoming compensation activities of his or her employees.

Proceeding to step 56 of the user process, the user may enter planned salary actions 122. As shown by the salary display 111 of FIG. 3D, each salary action may include an amount 160 of the salary action 122 and a date 162 of the planned action 122. Based on the amount 160 of the salary action, the compensation planner 25 may determine a percent increase 164. Based on the date 162 of the salary action, the compensation planner 25 may determine the number of months 166 between the planned salary action 122 and the previous salary action.

Here, Williams has a planned salary increase of $2,000 scheduled for Jan. 1, 1997. Smith has a planned salary increase of $1,000 also scheduled for Jan. 1, 1997. Thus, Williams has a percent increase of 6.25 percent. Smith has a percent increase of 3.12 percent. Both Williams and Smith had 12 months between salary actions.

For each salary action 122, the compensation planner 25 may determine an after action salary 168. Further, the compensation planner 25 may determine a percent to salary mid-point 170 and a percent to salary maximum 172 for the after action salary 168. Here, Williams has a percent to salary mid-point of 97.1 and a percent to salary maximum of 85.0. Smith has a percent to salary mid-point of 94.2 and a percent to salary maximum of 82.5.

The historical salary action 120 may be entered in the same manner of a planned salary action. Thus, the historical salary action 120 may include an amount of the salary action and a date of that action. Here, both Williams and Smith had a last salary action of $2,000 on Jan. 1, 1996. That salary action translates into a percent increase of 6.7 percent.

Proceeding to step 58 of the user process, planned bonuses 132 may be entered. As shown by FIG. 3E, the planned bonuses 132 may each include a bonus action amount 180 and a bonus date 182. As described later in more detail, the bonuses may be added by the compensation planner 25 to the salary for the year in which they are scheduled in order to determine total compensation for that year.

Step 58 of the user process leads to decisional step 60. At decisional step 60, the user may review the compensation plan to determine whether it appears to be acceptable. If the compensation planner is not acceptable, then NO branch or decisional step 60 returns to step 56 where the user may alter planned salary and/or bonus actions. When an acceptable compensation plan is obtained, the YES branch of decisional step 60 leads to step 62.

Figure 3H:
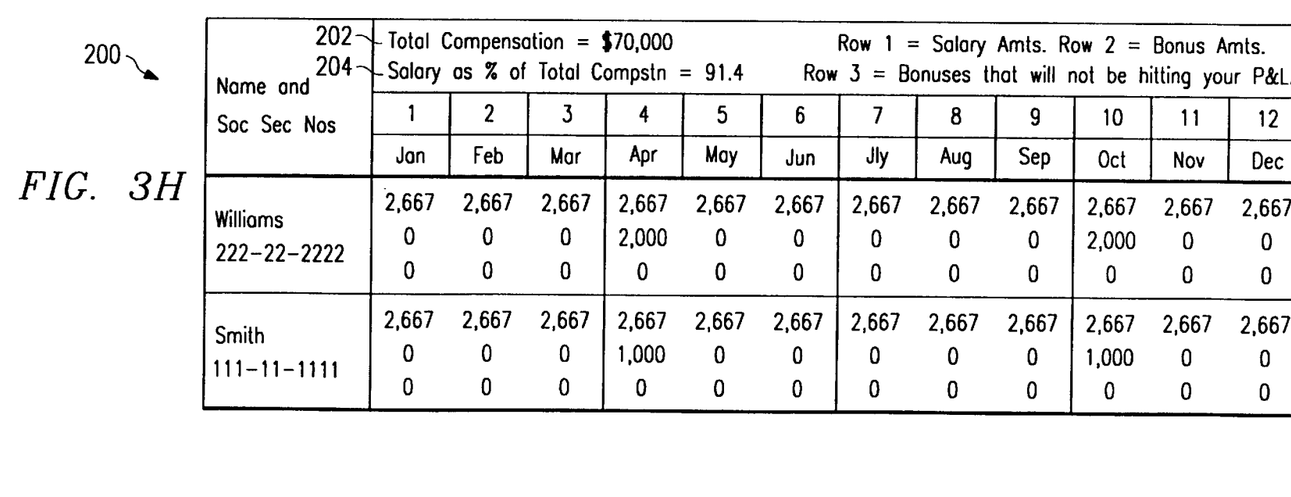

At step 62, the user may print an outlook record 200. FIG. 3H illustrates one embodiment of the outlook record 200. The outlook record 200 may include the salary and bonuses of each employee listed by month. Here, both Williams and Smith have a salary of $2,667 per month. Additionally, Williams has a $2,000 bonus scheduled in April and a $2,000 bonus scheduled in October. Smith has a $1,000 bonus scheduled in April and a $1,000 bonus scheduled in October.

The outlook record 200 may also include a total compensation value 202. The total compensation value 202 is the sum of the salary and bonuses for all the employees. Further, the outlook record may include a percent salary value 204. The percent salary value is the percent of total compensation that is paid a salary. The percent salary value 204 allows a manager to determine on average whether he or she is basing employee compensation too much or too little on bonuses and/or on salary. Here, the total compensation value 202 for Williams and Smith is $70,000. The percent salary value is 91.4 percent.

In another embodiment, the outlook record 200 may list a combined salary and bonus for the employees by month. This embodiment allows a manager to quickly see the total employee compensation per month.

Figure 3I:
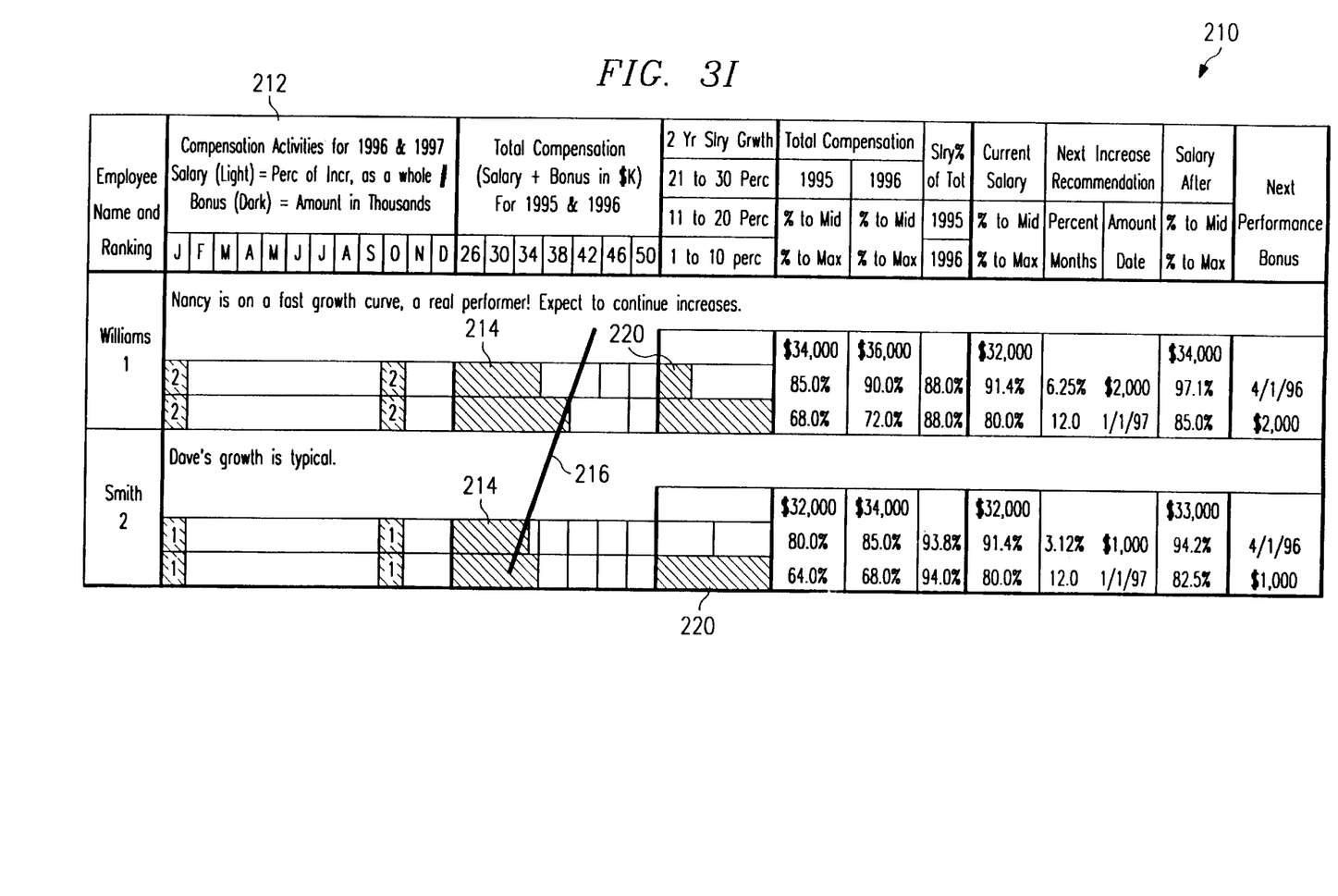

Proceeding to step 64 of the user process, the user may print a compensation plan report 210. FIG. 3I illustrates a compensation plan report 210. The compensation plan report 210 displays a wealth of information to the manager to allow him or her to determine whether a compensation plan is fair to the employees.

In the compensation plan report 210 the employees are listed by rank. A representation 214 of planned total compensation is displayed for each employee. The representation may be a bar graph. The representation 214 allows the manager to see the correlation between the rank and the total compensation for each employee in the compensation plan. Typically, as employees digress in rank, their total compensation should also decrease. In FIG. 3I, as shown by line 216, Smith has a lower ranking and a lower total compensation than Williams. Thus, the compensation plan is fair to Williams and Smith.

The compensation plan report 210 may also include a representation 220 of planned salary growth for each employee arranged by rank. The representation 220 may be a bar graph. Underpaid employees will typically have the highest growth. The representations 220 allow the manager to visually determine whether the compensation plan properly compensates the employees.

In addition to the representations, the compensation plan report 210 may also include a listing of compensation activities by month for each employee. Here, Williams and Smith have a salary action in January of 1996 and 1997 and a bonus action in April and October of 1996 and 1997. Numerical values for the represented information as well as total compensation percent to mid-points and to maximums, current salaries, and action amounts and dates may also be displayed. This information is discussed above in connection with entering the compensation information.

Figure 4:
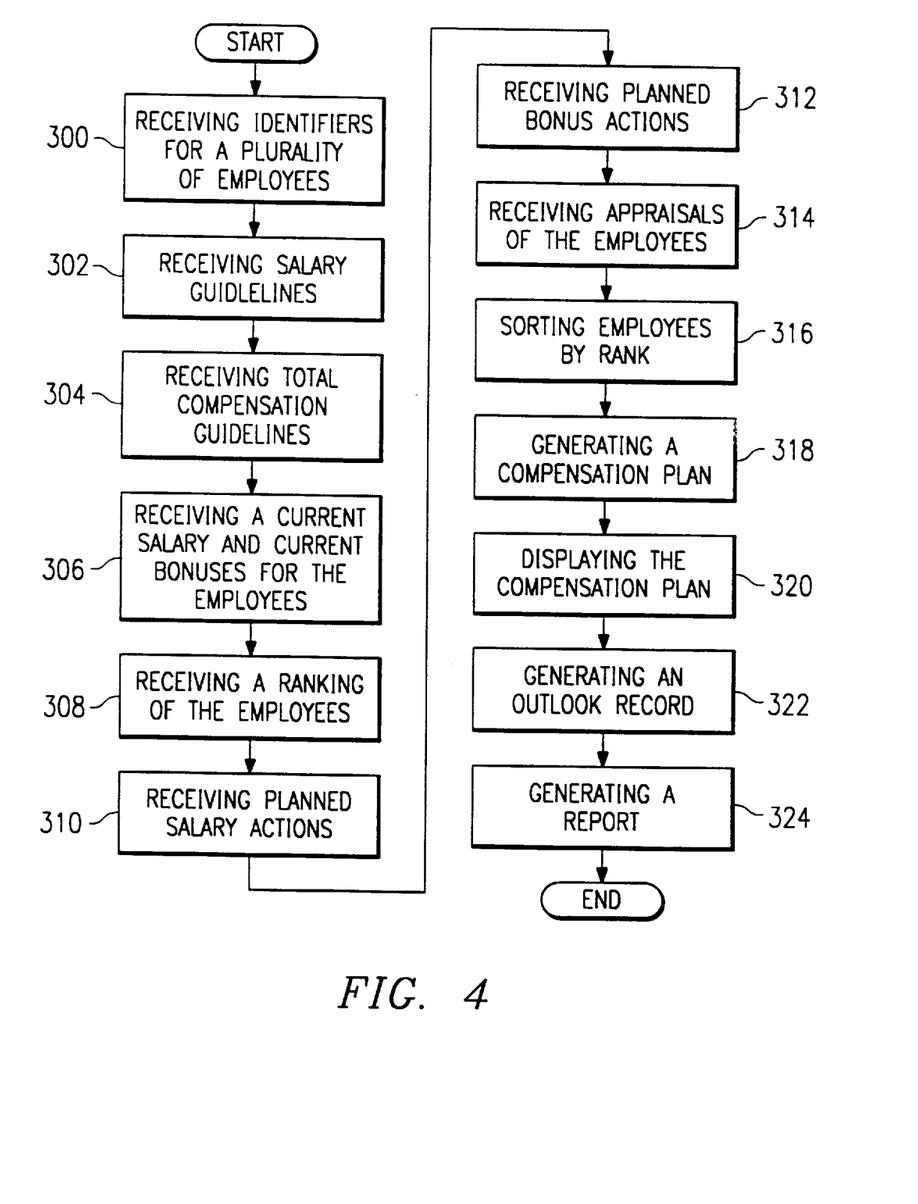
FIG. 4 is a flow chart of a method of compensation planning in accordance with the present invention.

FIG. 4 shows the method of the present invention for compensation planning. As previously discussed, the method of the present invention comprises a series of machine operations and not manual operations of a human operator. The method begins at step 300 in which the compensation planner 25 receives identifiers 100 for a plurality of employees.

Next, at step 302, salary guidelines may be received by the compensation planner 25. As previously discussed, the salary guidelines 78 may include a salary minimum and a salary maximum. The salary guideline 78 may also include a salary mid-point. The salary mid-point may be the numeric mid-point between the minimum and the maximum salary or may represent an average salary for the job code. At step 304, total compensation guidelines may be received. The total compensation guidelines may include a total compensation maximum. The total compensation guideline 80 may also include a total compensation minimum, if different form the salary minimum, and a total compensation midpoint. The total compensation mid-point may be the numeric mid-point between the minimum and the maximum total compensation or may represent an average total compensation for the job code.

Proceeding to step 306, a current salary and a current bonus may be received by the compensation planner 25. From the current salary and current bonuses, the compensation planner may determine a current total compensation for each employee. At step 308, a ranking 108 is received for each worker. As previously discussed, each employee may be assigned an individual rank or may be grouped into a smaller number of ranking ranges.

Next, at step 310, compensation planner 25 may receive one or more planned salary actions 122. As previously described, the salary actions 122 may include a salary action amount 160 and a salary action date 162. At step 312, the compensation planner 25 may receive one or more planned bonus actions 132. The planned bonus actions 132 may include a bonus action amount 180 and action date 182. Proceeding to step 314, appraisals of the employees may be received. The appraisals may include text describing the past and anticipated performance of the employees.

Next, at step 316, the compensation planner 25 may sort the employees by rank. Proceeding to step 318, a compensation plan may be generated. The compensation plan includes the received compensation information along with the above discussed information generated from the compensation information. For example, the compensation planner 25 generates percent to mid-point and percent to maximum calculations for the current salary, a planned salary action, current total compensation and planned total compensation. The compensation plan is displayed at step 320 for review by the manager.

Next, at step 322, an outlook record is generated. In generating the outlook record, the compensation planner 25 may determine the salary and bonuses paid to each employee by month or the combined salary and bonuses paid to the employees. Proceeding to step 324, the planner 25 may generate a compensation plan report 210. As previously discussed, the compensation report 210 displays information to allow a manager to determine whether the compensation plan is fair. Any compensation plan report 210 may include a representation 214 of planned total compensation for each employee. The representation 214 may be a bar graph. The representation allows the manager to see the correlation between the rank and the total compensation for each employee in the compensation plan. The compensation plan report 210 may also include a representation 220 of planned salary growth for each employee arranged by rank. The representation 220 may also be a bar graph. Typically, from the report, the highest ranking employee should have the highest compensation and/or the highest growth. Thus, ideally, there should be a high correlation between the rank and compensation of the employees. If the correlation is not high, a manager may wish to reformulate the compensation plan.

Those skilled in the art will understand that the various steps of the present invention may include error branches that cause the method to abort if an error condition such as the lack of free memory or the like exists in the computer system 12. Such error branches are well known in the art and are not directly related to the present invention. Accordingly, they will not be further described.

From the foregoing description of the present invention, other alternative constructions may suggest themselves to those skilled in the art. Therefore, the scope of the present invention is to be limited only by the claims below and the equivalence thereof.

What is claimed is:

1. A compensation planning tool for use in connection with a computing device, comprising:
   a compensation planner operable to receive and store compensation information for a plurality of employees;
   the compensation planner operable to sort the employees by rank and to display a compensation plan, the compensation plan including for each employee a current total compensation, a planned salary and a planned total compensation; and
   a report generator operable to generate a report from the compensation plan, the report including a representation of planned total compensation for each employee arranged by rank, the representations operable to visually display a correlation between the rank and the total compensation of the employees in the compensation plan.

2. The compensation planning tool of claim 1, the compensation information further comprising an identifier, a current salary, a current bonus, a current salary guideline, a current total compensation guideline, a planned salary action, a planned bonus action, and a ranking.

3. The compensation planning tool of claim 1, the compensation planner further operable to receive and store for each employee a job code with which a salary guideline and a total compensation guideline can be retrieved.

4. The compensation planning tool of claim 1, the compensation planner further operable to receive and store for each employee an appraisal.

5. The compensation planning tool of claim 2, the salary guideline further comprising a salary minimum and salary maximum and the total compensation guideline further comprising a total compensation maximum.

6. The compensation planning tool of claim 5, the compensation planner further operable to determine a salary mid-point and to display a percent to mid-point value and a percent to maximum value for the current salary.

7. The compensation planning tool of claim 5, the compensation planner further operable to determine a total compensation mid-point and to display a percent to mid-point value and a percent to maximum value for the current total compensation.

8. The compensation planning tool of claim 1, the compensation planner further operable to display outlook information including total compensation arranged by month for each employee.

9. The compensation planning tool of claim 1, the representation of planned total compensation comprising a graph.

10. The compensation planning tool of claim 1, the report of the compensation plan further comprising a representation of planned salary growth for each employee arranged by rank.

11. The compensation planning tool of claim 10, the representation of planned salary growth comprising a graph.

12. The compensation planning tool of claim 1, the compensation planner further operable to generate from the compensation plan a schedule of activities for each employee.

13. The compensation planning tool of claim 1, further comprising an outlook record generator to generate an outlook record from the compensation plan, the outlook record including the total compensation of the employees arranged by month.

14. A method of planning employee compensation, comprising the steps of:

receiving compensation information for a plurality of employees;

storing the compensation information for each employee;

sorting the employees by rank;

generating a compensation plan including a current total compensation, a planned salary and a planned total compensation for each employee;

displaying the compensation plan;

generating a report from the compensation plan, the report including a representation of planned total compensation for each employee arranged by rank; and displaying a correlation between the rank and the total compensation of the employees in the compensation plan.

15. The method of claim 14, wherein the step of receiving compensation information further comprises the steps of receiving an identifier, a current salary, a current bonus, a current salary guideline, a current total compensation guideline, a planned salary action, a planned bonus action, and a ranking for each employee.

16. The method of claim 14, further comprising the steps of:

receiving a job code for each employee; and retrieving with the job code a salary guideline and a total compensation guideline for each employee.

17. The method of claim 14, further comprising the step of displaying outlook information including total compensation arranged by month for each employee.

18. The method of claim 14, further comprising the step of generating a representation of planned salary growth for each employee arranged by rank.

19. A computer system for planning employee compensation, comprising:

means for receiving and storing compensation information for a plurality of employees;

means for sorting the employees by rank and displaying a compensation plan including a current total compensation, a planned salary and a planned total compensation for each employee; and means for generating a report from the compensation plan, the report including a representation of planned total compensation for each employee arranged by rank, the representations visually displaying a correlation between the rank and the total compensation of the employees in the compensation plan.

20. The computer system of claim 19, further comprising means for generating a representation of planned salary growth for each employee arranged by rank.

* * * * *